(12) United States Patent
Devreux et al.

(10) Patent No.: US 10,508,201 B2
(45) Date of Patent: Dec. 17, 2019

(54) METHODS FOR MANUFACTURING AZOIC PIGMENTS

(71) Applicant: CAPPELLE PIGMENTS NV, Menen (BE)

(72) Inventors: Vincent Devreux, Menen (BE); Greta Verspaille, Menen (BE); Jürgen D'haeveloose, Benen (BE); Emmanuelle Clabaux, Menen (BE)

(73) Assignee: Ferro Corporation, Mayfield Heights, OH (US)

( * ) Notice: Subject to any disclaimer, the term of this patent is extended or adjusted under 35 U.S.C. 154(b) by 0 days.

(21) Appl. No.: 16/062,133

(22) PCT Filed: Dec. 13, 2016

(86) PCT No.: PCT/EP2016/080817
§ 371 (c)(1),
(2) Date: Jun. 14, 2018

(87) PCT Pub. No.: WO2017/102739
PCT Pub. Date: Jun. 22, 2017

(65) Prior Publication Data
US 2018/0362769 A1    Dec. 20, 2018

(30) Foreign Application Priority Data
Dec. 14, 2015  (EP) .................................. 15199903

(51) Int. Cl.
*C09B 67/08* (2006.01)
*C09B 67/02* (2006.01)
*C09D 11/037* (2014.01)

(52) U.S. Cl.
CPC ...... *C09B 67/0013* (2013.01); *C09B 67/0097* (2013.01); *C09D 11/037* (2013.01)

(58) Field of Classification Search
CPC ............ C09B 67/0013; C09B 67/0097; C09D 11/037
See application file for complete search history.

(56) References Cited

U.S. PATENT DOCUMENTS

| | | | |
|---|---|---|---|
| 3,446,640 A | 5/1969 | Orlova et al. | |
| 3,725,101 A | 4/1973 | Kuhne et al. | |
| 3,904,562 A | 9/1975 | Hopfenberg et al. | |
| 4,251,441 A | 2/1981 | Frölich et al. | |
| 4,301,049 A | 11/1981 | Funatsu et al. | |
| 4,457,783 A | 7/1984 | Hamilton et al. | |
| 4,474,609 A | 10/1984 | Ehl et al. | |
| 4,643,770 A | 2/1987 | Hays | |
| 5,024,698 A | 6/1991 | Schwartz et al. | |
| 5,116,649 A | 5/1992 | Massouda | |
| 5,151,129 A | 9/1992 | Morrison et al. | |
| 5,696,242 A | 12/1997 | Barra et al. | |
| 5,766,269 A | 6/1998 | Berenguer et al. | |
| 5,837,045 A | 11/1998 | Johnson et al. | |
| 6,261,354 B1 | 7/2001 | Vermoortele et al. | |
| 6,464,772 B1 | 10/2002 | Vermoortele et al. | |
| 7,019,121 B2 | 3/2006 | Sung et al. | |
| 7,955,470 B2 | 6/2011 | Kapp et al. | |
| 8,034,174 B2 | 10/2011 | Schwartz et al. | |
| 2007/0141247 A1 | 6/2007 | Hall et al. | |
| 2007/0240618 A1 | 10/2007 | Rohr et al. | |

FOREIGN PATENT DOCUMENTS

| | | |
|---|---|---|
| WO | 2008/058703 A1 | 5/2008 |
| WO | 2013/066246 A1 | 5/2013 |

OTHER PUBLICATIONS

International Search Report for corresponding PCT/EP2016/080817 dated Mar. 14, 2017, three pages.
Database WPI, Thompson Scientific, London, GB, XP-002758618, KR 2014-0051564, UK Seung Chem. Co. Ltd., May 2, 2014, one page.
Database WPI, Thompson Scientific, London, GB, XP-002758619, CN 1215720, Univ. Huadong Sci. & Eng., May 5, 1999, one page.

*Primary Examiner* — Anthony J Green
(74) *Attorney, Agent, or Firm* — Rankin, Hill & Clark LLP (57) ABSTRACT

A method for manufacturing an azoic pigment is disclosed, according to an illustrative embodiment of the present invention. The method includes producing slurry of the azoic pigment. The slurry includes primary aromatic amine (PAA). The method further includes the derivatization of the residual PAA in the slurry, followed by encapsulation of the slurry. The slurry is acidified or basified. Finally, the slurry is further processed, thereby forming PAA migration free azoic pigment. The derivatization and encapsulation additively or synergistically reduce the PAA content thereby inhibiting migration of PAA from the pigment into a substrate onto which the pigment is loaded.

23 Claims, 4 Drawing Sheets

Figure 3 derivatization agent of the free residual aromatic amine followed by the encapsulation.

- Free residual aromatic Amine (PAA)
- Derivatization agent – chemically bound to the free residual aromatic amine Encapsulation of the pigment : the derivatization agent used is a bifunctional agent reacting with the residual free aromatic amine and being used as a monomer to further encapsulate the pigment.

- Free residual aromatic Amine (PAA) which is chemically bound to the polymer synthesized during the encapsulation

METHODS FOR MANUFACTURING AZOIC PIGMENTS

FIELD OF THE INVENTION

The present invention relates generally to methods for manufacturing azoic pigments. More particularly, the present invention relates to methods for manufacturing primary aromatic amines (PAA) migration free azoic pigments.

BACKGROUND OF THE INVENTION

With increasing competition in consumer industry, companies are investing substantially on different characteristics of the packaging of edible products to become eye-catchers for their consumers. Apart from edible products, focus is also on packaging/appearance of other products such as tissue, paper wipes intended for skin, boards, plastics (e.g. plastic children toys), and so forth. The sought-after characteristics of the packaging include color vibrancy, color consistency, transparency, hue, saturation, glossiness, color retention, etc. However, such packaging or appearance involves the use of chemical inks, for instance, formulated with azoic pigments. Azoic pigments include certain impurities such as primary aromatic amines (PAA) having a tendency to migrate from the packaging to the product, either by permeation through the packaging, or by set-off via contact migration. The primary aromatic amines are present on the pigment as residual starting material, or as a degradation product of a starting material. The combination of food type, printed packaging type, ink type, contact time, contact temperature and repeated use can result in the migration of primary aromatic amines from the packaging into the food, potentially harming the end-consumer.

Contamination of the foodstuff from the packaging by primary aromatic amines is tightly regulated by Annex II, § 1 of the European regulation EU/10/2011, known as the PIM or Plastics Implementation Measure, requiring that plastic and multi-layered plastic materials and articles in contact with food may not release primary aromatic amines into the said food, in which a detection limit of 0.01 mg of primary aromatic amines (as their sum) per kg foodstuff is regarded as detection limit.

Also the Swiss government has applied the same restrictions with respect to the migration of primary aromatic amines in the Swiss Ordinance SR817.023.21, in which the scope is further extended to all materials for food contact, incorporating for instance inks, paper, board, regenerated cellulose, silicone, . . . .

One of the conventional arts to circumvent the migration of primary aromatic amines into the foodstuff is to use color indexes i.e. non-azoic pigments, having neither primary aromatic amines as starting material, nor compounds releasing primary aromatic amines by degradation. Some examples of these non-azoic pigments include diketopyrrolopyrrole (DPP), quinophtalone, or inorganic pigments. However, such pigments often do not have the required coloristic properties found on azoic pigments. As an example, inorganic pigments typically have a color strength up to five times lower than azoic pigments, are unable to cover the wide color space as adequately as azoic pigments, and typically, but not generally, have low chroma and low transparency levels with respect to azoic pigments. In addition, non-azoic pigments are typically more expensive than azoic pigments.

Another conventional art discloses UV-curable, low migration inks such as SunCure (Sun Chemical Corporation). Such method involves immobilization of all migratable impurities using advanced crosslinking and netting. However, the method currently limits the applicability of such inks on substrates suitable for UV-curing. Also, UV-curable products are not suitable for small packaging for food for infants and small children as the release of acrylic monomer, photo-initiators or other impurities to infant food, due to incomplete polymerization and subsequent curing, cannot be guaranteed. In addition, UV-curable inks such as the abovementioned SunCure are restricted from use in microwave or ovenable consumable goods or food products which require direct contact with the packaging material. Moreover, the aforementioned method is limited to substrate printing, and has no benefit in f.i. mass coloured plastics such as, but not limiting to, masterbatches.

In another instance disclosed in WO2005105928A1, (Clariant Produkte GmbH), the manufacturing of high purity naphtol AS pigments is disclosed by using microreactors, followed by solvent wash and membrane microfiltration. Such method, though resulting in low residual primary aromatic amine content, requires a tailored set of parameters per pigment production. In addition, the method involves extra cost for production, for example, investments in micro reactors, membranes for purification, and expenditure on ATEX-equipment. The method also requires extra production time as the method requires effectiveness for some thorough steps such as washing of agglomerates by solvent switch, trace solvent removal, solvent recuperation, etc. Furthermore, the said method is only specified for the manufacturing of red naphtol type azoic pigments.

According to another instance as disclosed by WO2009129455A8 (Sun Chemical Corp.), an in situ synthesis of a solid solution of C.I. Pigment Yellow 13 and C.I. Pigment Yellow 83 can improve the primary aromatic amine content as compared to the separate synthesis of C.I. Pigment Yellow 13 and C.I. Pigment Yellow 83. However, PAA content still remains high as 370 ppm calculated as aniline versus a general trend towards a limit lower than 20 ppm of residual primary aromatic amines on the pigment for food contact applications.

According to yet another conventional instance, as disclosed in WO2013066246A1 (Xylophane Aktiebolag), a barrier layer can be incorporated in the substrate to prevent the migration of primary aromatic amines, be it a functional barrier such as polyvinyl alcohol (PVOH), ethylene vinyl alcohol (EVOH) or an absolute barrier such as aluminium foil or a metallized plastic. Also, an immobile top coat barrier such as Novaset (Flint Group) can be applied on the printed surface to eliminate contact migration by set-off. However, such barrier increases the overall cost and is limited to only plastic packaging manufacturing or laminated, multi-layered tetra-brik type containers. Furthermore, as disclosed in U.S. Pat. No. 5,116,649 A (Westvaco Corporation), barrier films based on EVOH have little to no adhesion to most polymers and paper, except for nylon, and finally, EVOH resins are sensitive to the effects of moisture, resulting in a reduced barrier performance by increasing relative humidity.

The invention U.S. Pat. No. 4,643,770 describes the reduction of free primary aliphatic fatty amine on pigment preparations for ink applications involving a flushing process. Aliphatic fatty amines are amongst others used as surfactants to improve the compatibility of the water containing pigment press cake with the organic phase used during the flushing process, and to improve the dispersibility of said pigment, optionally by forming a long chain ketamine from the acetoacetyl moiety of the pigment. As typically large molar equivalent excess of fatty amine with respect to the pigment are used, the process yields substantial residual amounts of fatty amines. It is known in the art that excess fatty (di)amine can have detrimental effects on ink formulations, or induce foaming. Abovementioned patent provides a solution by converting only a small part (typically 5 mole percent) of the acetoacetyl moiety of coupling agent to a ketamine prior to pigment synthesis. However, it only considers aliphatic primary amines, and the resulting pigment composition still contains less than one percent of residual aliphatic amine, thus not offering a solution for trace quantities of primary aromatic amines at parts per million level from the pigment synthesis.

As a conclusion, the described examples show that it is difficult to achieve PAA migration free azoic pigment.

Therefore, there exists a need for developing a method for manufacturing azoic pigments free of migration of PAA which is cost saving and effective.

SUMMARY OF THE INVENTION

The present invention discloses a method for manufacturing an azoic pigment. The method includes obtaining slurry of the azoic pigment produced by a process of synthesis followed by an optional heat treatment thereof. The slurry includes primary aromatic amines present as an impurity from residual starting material and/or as byproduct of the synthesis process. The method further includes the derivatization of the primary aromatic amines contained in the slurry, followed by the encapsulation of the pigment present in the slurry. The slurry is then optionally acidified or basified. Finally, the slurry is further processed, thereby forming an azoic pigment having a very low residual PAA level. The derivatization of the free residual aromatic amines (hereinafter referred to as free PAA) and the encapsulation of the pigment additively or synergistically reduce the PAA content, thereby minimizing the risk of migration of PAA from the pigment to a surface in contact.

In an embodiment a method for manufacturing an azoic pigment is provided, the method comprising:
i) obtaining a slurry of the azoic pigment, the slurry including residual primary aromatic amine (PAA);
ii) derivatization of the residual PAA in the slurry by adding a derivatization agent to the slurry;
iii) encapsulation of the pigment in the slurry;
iv) final processing of the slurry, forming an encapsulated PAA migration free azoic pigment;
wherein the derivatization of the residual free PAA and encapsulation of the pigment additively or synergistically reduce PAA content thereby inhibiting migration of PAA from the pigment to a surface in contact.

The method may optionally comprise as step of acidification or basification of the slurry. This step may be performed after step i), or after step ii, or after step iii.

Further, the method may optionally comprise a method of working up the slurry, the method comprising the steps of filtering and washing the pigment to obtain a pigment paste, and reslurrying the pigment paste by adding an amount of solvent; stirring said dispersion in a temperature range comprised between 10° C. and 180° C., preferably between 15° C. to 60° C. until an equilibrium on particle size distribution is reached. The working up of the slurry may be performed prior to step ii), or prior to step iii).

In an embodiment of the present invention, derivatization of the free PAA of the slurry includes addition of a derivatization agent into the slurry, wherein the derivatization agent is an aldehyde, a ketone, an acyl halide, a sulfonyl halide, an organic acid anhydride, an epoxide, an epoxy wax, an isocyanate, a (substituted) acrylic acid, a (substituted) acrylic acid ester, an (substituted) unsaturated aldehyde, a (substituted) unsaturated ketone, a (substituted) ethylene sulfonate, a lactone, a lactam, a haloalkane or a combination thereof.

In an embodiment of the present invention, encapsulation of the pigment includes the addition of a monomer, or a set of monomers to the slurry for encapsulation.

Such monomer may comprise one or more functional polymerizable groups selected from a vinyl group, an unsaturated carboxylic group such as, but not limiting to, an acrylate group, an acrylamide group, a methacrylate group, an unsaturated sulfonic group, an organosilane group, a halosilane group, an organomodified siloxane group, an isocyanate group, an epoxide group, a lactone, a lactam, or any combination thereof or any coating of a dual layer resulting thereof.

The set of monomers comprises [A] one or more monomers bearing one or more functionalities such as, but not limiting to, a haloalkane, an organic acid, an ester, an acyl chloride, an organic acid anhydride, an isocyanate, and [B] one or more monomers bearing one or more functionalities such as, an alcohol, an amine, an epoxide or any combination thereof or any coating of a dual layer resulting thereof.

In a particular embodiment, the derivatization agent used to react with the free PAA may be a bifunctional agent for derivatization of the free PAA and encapsulation of the pigment.

The acidification/basification is performed by adding an acid selected from the group of hydrogen halides with halogen in (Cl, Br, I), sulfuric acid, sulphurous acid, phosphorous acid, phosphoric acid, hypophosphorous acid, nitric acid, sulphamic acid, carboxylic acids, or organic sulfonic acids such as methanesulfonic acid or a base selected from the group of caustic soda, potassium hydroxide, lithium hydroxide, calcium hydroxide or sodium (bi)carbonate.

The solvent used for reslurrying the pigment past is demineralized water, an ether of a polyglycol or an ester of a polyglycol.

Reslurrying may be carried out in a temperature range comprised between 10° C. and 180° C., preferably between 15° C. to 60° C. until the particle size at equilibrium is less than 1 µm, or less than 2 µm, or less than 5 µm.

In an embodiment of the present invention, an azo based pigment is provided, obtained from a method in accordance with the present invention, wherein the primary aromatic amine content in the pigment is below 20 ppm, preferably below 10 ppm, and more preferably below 1 ppm.

A pigment according to the present invention may be suitable for being incorporated into an ink in a range of 0.1-50% by weight with respect to the ink. Such ink may be one of but not limited to water-based acrylic, mineral offset, vegetable offset, polyamide, polyvinylbutyral, polyvinylchloride, solvent based nitrocellulose, cellulose acetate or UV-curable ink.

A pigment according to the present invention may be suitable for being loaded into a substrate.

Such substrate may be one of but not limited to cellulose type such as Kraft/layered/meat paper/regenerated cellulose/board, or plastic such as (L)LDPE/PP/cellulose acetate/PET/PA/PVC/silicone/ . . . , or in particular nonwoven fabric.

BRIEF DESCRIPTION OF THE DRAWINGS

Other objects, features, and advantages of the invention will be apparent from the following description when read with reference to the accompanying drawings. In the drawings, wherein like reference numerals denote corresponding parts throughout the several views.

DETAILED DESCRIPTION OF THE INVENTION

Azoic pigments are used as coloring indexes for packaging materials to be wrapped onto edible or non-edible products. The azoic pigments include primary aromatic amines which have a tendency to migrate from the pigment to the products, thereby potentially causing harm to the consumer of the products. A number of methods have been developed for inhibiting the migration; however, the methods are expensive and limit applicability of the pigment. Thus, the present invention discloses methods for manufacturing PAA migration free azoic pigments, which are cost saving, environmental friendly and time saving.

Figure 1:
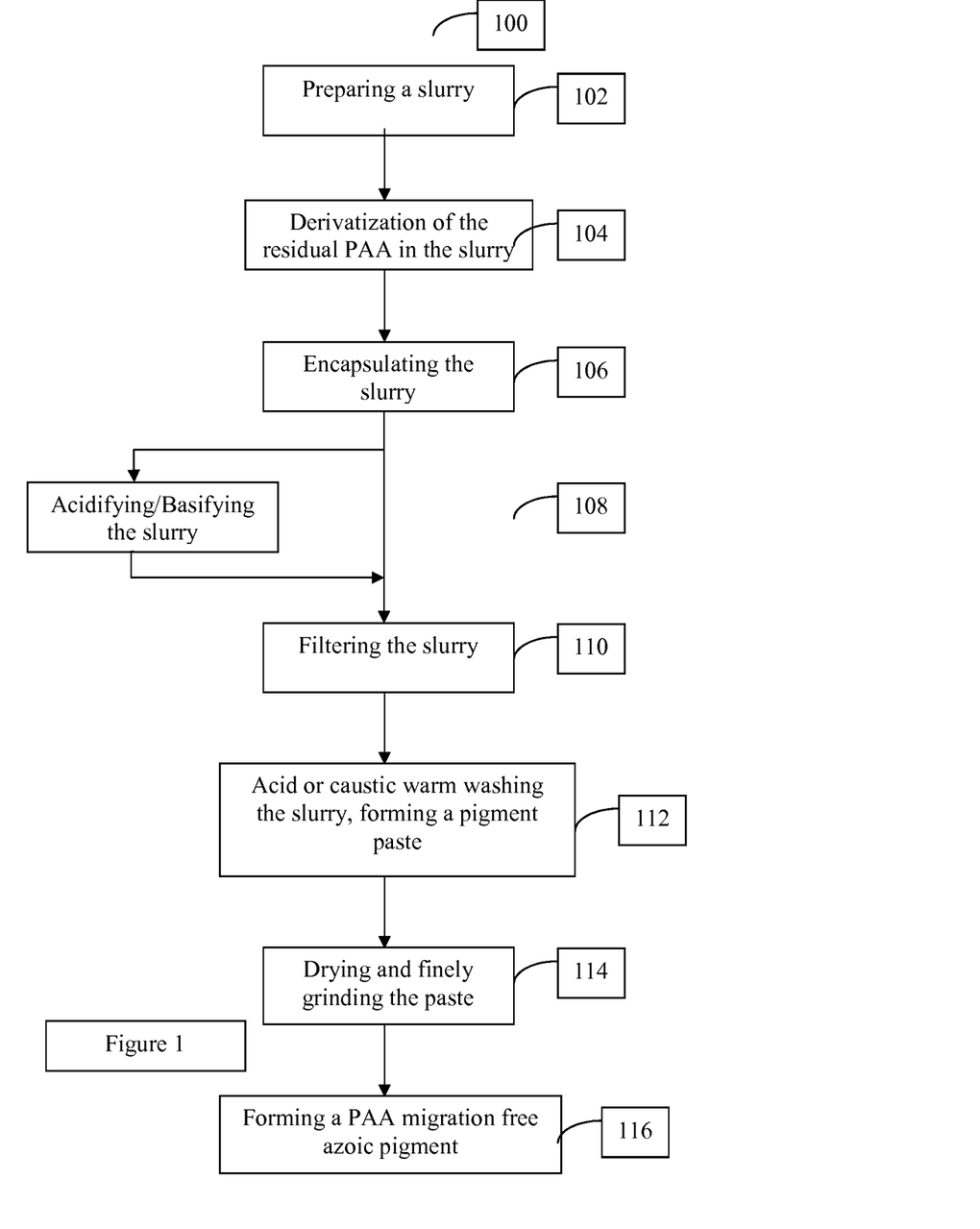
FIG. 1 illustrates a flowchart depicting a method for manufacturing an azoic pigment, according to an illustrative embodiment of the present invention.

The present invention discloses a method 100 for manufacturing azoic pigments, according to an illustrative embodiment as depicted in FIG. 1. Examples of azoic pigments include, but are not limited to C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 9, C.I. Pigment Yellow 10, C.I. Pigment Yellow 12, C.I. Pigment Yellow 13, C.I. Pigment Yellow 14, C.I. Pigment Yellow 16, C.I. Pigment Yellow 17, C.I. Pigment Yellow 55, C.I. Pigment Yellow 61, C.I. Pigment Yellow 62, C.I. Pigment Yellow 62:1, C.I. Pigment Yellow 63, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 87, C.I. Pigment Yellow 93, C.I. Pigment Yellow 94, C.I. Pigment Yellow 95, C.I. Pigment Yellow 97, C.I. Pigment Yellow 100, C.I. Pigment Yellow 104, C.I. Pigment Yellow 105, C.I. Pigment Yellow 111, C.I. Pigment Yellow 116, C.I. Pigment Yellow 120, C.I. Pigment Yellow 126, C.I. Pigment Yellow 127, C.I. Pigment Yellow 127:1, C.I. Pigment Yellow 128, C.I. Pigment Yellow 130, C.I. Pigment Yellow 133, C.I. Pigment Yellow 134, C.I. Pigment Yellow 136, C.I. Pigment Yellow 150, C.I. Pigment Yellow 151, C.I. Pigment Yellow 152, C.I. Pigment Yellow 154, C.I. Pigment Yellow 155, C.I. Pigment Yellow 165, C.I. Pigment Yellow 166, C.I. Pigment Yellow 167, C.I. Pigment Yellow 168, C.I. Pigment Yellow 169, C.I. Pigment Yellow 170, C.I. Pigment Yellow 172, C.I. Pigment Yellow 174, C.I. Pigment Yellow 175, C.I. Pigment Yellow 176, C.I. Pigment Yellow 180, C.I. Pigment Yellow 181, C.I. Pigment Yellow 182, C.I. Pigment Yellow 183, C.I. Pigment Yellow 188, C.I. Pigment Yellow 190, C.I. Pigment Yellow 191, C.I. Pigment Yellow 191:1, C.I. Pigment Yellow 194, C.I. Pigment Yellow 198, C.I. Pigment Yellow 200, C.I. Pigment Yellow 203, C.I. Pigment Yellow 204, C.I. Pigment Yellow 205, C.I. Pigment Yellow 206, C.I. Pigment Yellow 213, C.I. Pigment Orange 1, C.I. Pigment Orange 2, C.I. Pigment Orange 5, C.I. Pigment Orange 13, C.I. Pigment Orange 16, C.I. Pigment Orange 17, C.I. Pigment Orange 19, C.I. Pigment Orange 22, C.I. Pigment Orange 24, C.I. Pigment Orange 34, C.I. Pigment Orange 36, C.I. Pigment Orange 38, C.I. Pigment Orange 46, C.I. Pigment Orange 62, C.I. Pigment Orange 64, C.I. Pigment Orange 67, C.I. Pigment Orange 72, C.I. Pigment Orange 74, C.I. Pigment Orange 79, C.I. Pigment Red 266, C.I. Pigment Red 267, C.I. Pigment Red 268, C.I. Pigment Red 269, C.I. Pigment Red 273, C.I. Pigment Red 274, C.I. Pigment Red 276, C.I. Pigment Red 277, C.I. Pigment Red 278, C.I. Pigment Red 280, C.I. Pigment Red 281, C.I. Pigment Violet 25, C.I. Pigment Violet 32, C.I. Pigment Violet 44, C.I. Pigment Violet 50, C.I. Pigment Blue 25, C.I. Pigment Brown 1, C.I. Pigment Brown 23, C.I. Pigment Brown 25 or C.I. Pigment Brown 42.

As shown in FIG. 1, the method 100 includes a number of steps, however, the sequence of the method steps disclosed hereinafter are exemplary for the sake of understanding the invention for persons skilled in the art. The method 100 starts at step 102 where slurry of azo based pigment is obtained by in-situ process. Preferably the slurry is obtained by a process of synthesis of azo based pigment followed by an optional heat treatment.

According to some embodiments, the slurry can be heated in a temperature range of 50° C. to 100° C. The slurry includes residual PAA content present therein.

After the pigment slurry is obtained, the method proceeds to step 104 where derivatization of the free PAA is performed. The derivatization step 104 converts the unwanted residual primary aromatic amines present in the slurry to non-harmful derivatives thereof by a chemical reaction between the amine function and the derivatization agent, as depicted in the FIG. 4. According to some embodiments, the derivatization includes adding a predetermined amount of derivatization agent. Further, the derivatization step 104 is performed at a predetermined temperature range and at a predetermined pH-level for a predetermined period of time.

In an embodiment of the present invention, the derivatization of the free PAA is performed within a temperature range 10 to 99° C., at a pH value ranging between 4 and 13 for a time period ranging between 0.01 to 4 hours.

Derivatization agent product families may include but are not limited to aldehydes, ketones, acyl halides, sulfonyl halides, organic acid anhydrides, epoxides, epoxy waxes, isocyanates, isothiocyanates, (substituted) acrylic acids and their corresponding esters, (substituted) acryl amides, (substituted) unsaturated aldehydes, (substituted) unsaturated ketones, (substituted) ethylene sulfonates, haloalkanes, lactones, lactams, hydrogen peroxide, organic peroxides, sodium nitrite, phosgene, thionyl chloride, carbonyl diimidazole or any combination thereof. Preferably acyl chlorides, sulfonyl chlorides or salts of ethylene sulfonic acid are used.

According to some embodiments, the concentration of the derivatization agent depends on the residual amount of primary aromatic amines in the vessel after synthesis of the slurry, for instance, 0.5 to 20 mole percent of the derivatization agent w.r.t. the azoic pigment. Various examples of the derivatives obtained by the step of derivatization include but are not limited to Schiff bases, amides, sulfonamides, ethoxylated amines, carbamates, urea derivatives, deaminated amines, taurine derivatives, beta-amino-acids or their corresponding esters by aza-Michael addition, beta-amino-amides, beta-amino-ketones, or any derivative combination thereof. In an example, the derivatization of an azo based pigment slurry obtained from synthesis is performed by putting the slurry at a pH 9 with 28% caustic soda at 40° C. under vigorous stirring. Thereafter, 1% benzoyl chloride is added to the slurry, and the pigment slurry is stirred for 1 to 4 hours at 40° C. According to some embodiments of the present invention, if the pH of the slurry at step 104 is not within range of the predetermined pH conditions required for derivatization of the free PAA, then the pH is corrected before the derivatization. Therefore, a pH correction step may be performed prior to derivatization of the free PAA for achieving optimal derivatization conditions. The acidification/basification is performed by adding an acid selected from the group of hydrogen halides with halogen in (F, Cl, Br, I), sulfuric acid, sulfurous acid, phosphorous acid, phosphoric acid, hypophosphorous acid, nitric acid, sulphamic acid, carboxylic acids, or organic sulfonic acids such as methanesulfonic acid or a base selected from the group of caustic soda, potassium hydroxide, lithium hydroxide, calcium hydroxide or sodium (bi)carbonate.

The method 100 proceeds to step 106 where encapsulation of the pigment is performed. According to some embodiments, the encapsulation traps impurities in the slurry and can be performed by in situ polymerization due to a relevant selection of the monomer(s). The polymerization involves the synthesis of different polymer strands achieving preferably a uniform shell around the pigment particle, or in the absence of the uniform shell, a net, with holes small enough not to leach the impurities (PAA) through the net.

The encapsulation step includes addition of a monomer or a set of monomers to the slurry in the presence of an initiator at a predetermined temperature range from 10° C. to 100° C., preferably 30 to 60° C.

A monomer may preferably comprise one or more polymerizable functional groups which may be selected from a vinyl group, an unsaturated carboxylic group such as an acrylate group, an acrylamide group, a methacrylate group, an unsaturated ketone, an unsaturated aldehyde, an unsaturated sulfonic group, an organosilane group, a halosilane group, an organomodified siloxane group, an epoxide group, a lactone, a lactam, or any combination thereof or any coating of a dual layer resulting thereof.

A set of monomers may preferably comprise [A] one or more monomers bearing one or more functional acceptor type groups such as, but not limiting to, halogen leaving group, organic acid, ester, acyl halogenide, organic acid anhydride, sulfonyl halide, nitrile, isocyanate, isothiocyanate, ketone, aldehyde, epoxide, organosilane, halosilane, organomodified siloxane, lactone, lactam, vinyl, and [B] one or more monomers bearing one or more donor type functional groups such as, but not limiting to, an alcohol, a thiol, an amine, or any combination thereof, or any coating of a dual layer resulting thereof.

An initiator may be for example a persulfate, a metabisulfite, a peroxide combined with a transition metal e.g. $Fe^{2+}$, an organic peroxide, e.g. dibenzoyl peroxide, azo(bis) isobutyronitrile, or a photoinitiator, e.g. bis(2,4,6-trimethylbenzoyl)phenylphosphine oxide (IRGACURE 819).

Figure 4:
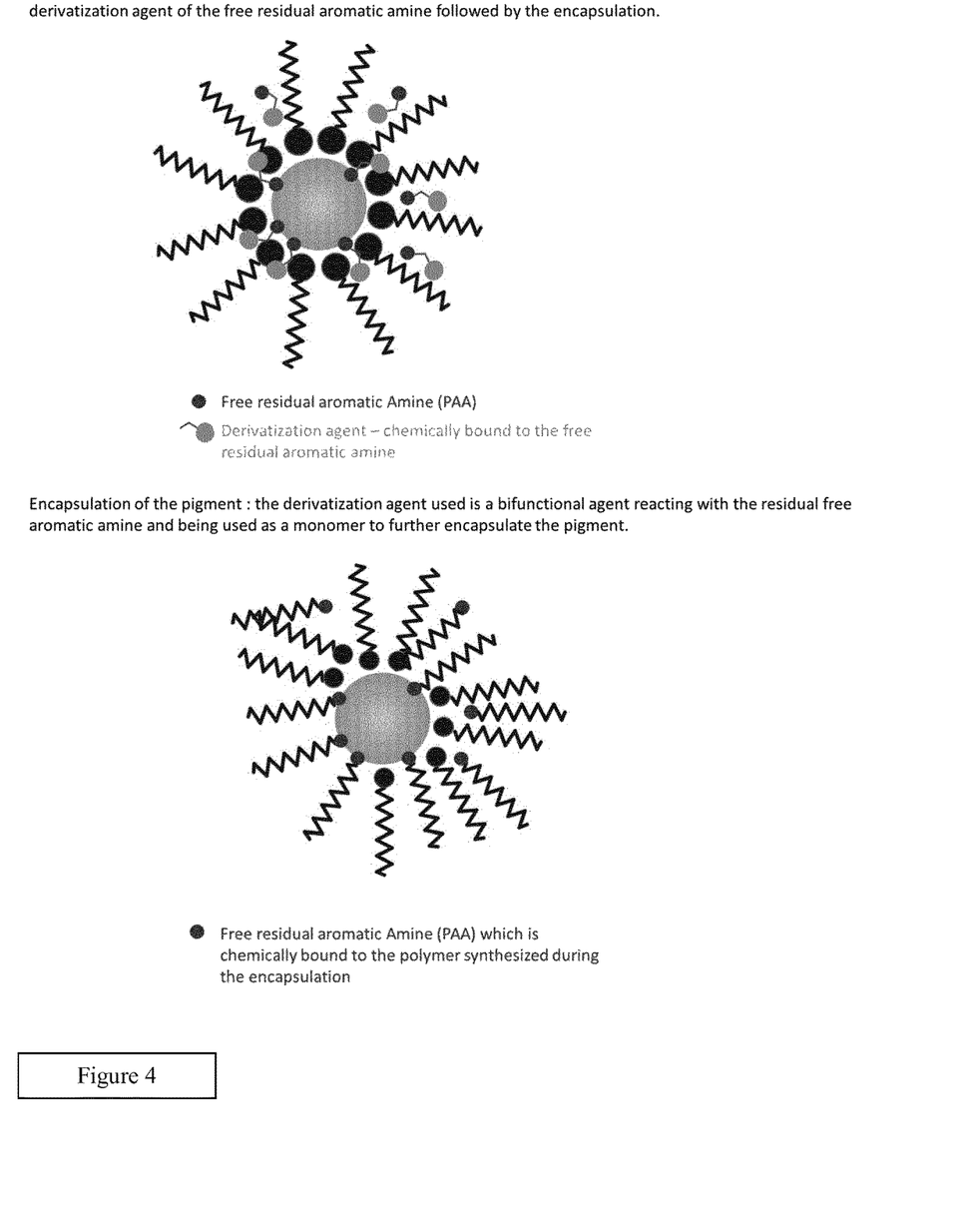
FIG. 4 illustrates the principle of the encapsulation described in the different embodiments of this invention.

In some embodiments, as depicted in FIG. 4, a bifunctional agent may be used to perform both the derivatization of the free PAA and further the encapsulation of the pigment, in which the bifunctional agent comprises [A] one or more functional groups (for example similar functionalities as the above mentioned derivatization agents) for reacting with the amine functionality of the primary aromatic amine, and [B] one or more reactive monomers such as, but not limiting to, the above mentioned monomers with polymerizable functional groups.

In some embodiments, the derivatization and encapsulation process steps will occur simultaneously (FIG. 4), as the reaction product of the primary aromatic amine with a derivatization reagent comprising a reactive functional group such as, but not limiting to, a lactone, a lactam, or an epoxide, can in itself induce autopolymerization with excess derivatization reagent, the derivatization agent also being a monomer.

In an example, the encapsulation step 106 is performed after derivatization step 104 by first heating the slurry at 80° C., followed by the addition of 10% dipropyleneglycol diacrylate (by weight, with respect to the pigment). A solution of 10% ammoniumperoxodisulfate in water is added as initiator, followed by stirring of the solution for 2 hours at 80° C.

The encapsulation of the pigment requires more quantity of the monomer as compared to that of the derivatization agent added during the derivatization step 104 w.r.t. the weight of the azoic pigment. For example, a 10 nm, homogenous, closed shell around a particle of 500 nm requires at least 12% by weight of coating. Density of the pigment defines a density of the coating.

After the encapsulation of the pigment is performed, the method 100 includes performing optionally an acidification or basification of the slurry as indicated at step 108. The acidification or basification includes addition of acid or base to the slurry respectively. Examples of acid include, but are not limiting to, a hydrogen halide with halogen in (F, Cl, Br, I), sulfuric acid, phosphoric acid, phosphorous acid, hypophosphorous acid, nitric acid, sulphamic acid, carboxylic acids, organic sulfonic acids such as, but not limiting to, methanesulfonic acid. Examples of base include, but are not limited to caustic soda, potassium hydroxide, lithium hydroxide, calcium hydroxide or sodium (bi)carbonate.

The acidification is performed to wash out traces of unreacted amine, while the basification is performed to wash out traces of unreacted coupling agent. In an instance, the acidification is performed when the pH of the slurry is less than 2, while the basification is performed when the pH of the slurry is in the range of 10 and 12.

At step 110, the slurry is filtered. The slurry is further exposed to a washing process, hereby forming a pigment paste as shown at step 112. The washing process can be performed with tap water, purified river water, RO-water, demineralized water or a combination thereof. The washing water can be acid, neutral or caustic. Examples of acids and bases are identical to those used in the acidification/basification step 108. The concentration of acid or base ranges typically from 0.1 to 10%, preferably from 0.2 to 2%. The washing water can have a temperature range of 5 to 100° C. The paste is dried and finely ground to a powder at step 114 to provide an encapuslated PAA migration free azoic pigment as illustrated at step 116.

The dried pigment in accordance with the present invention may then by further dispersed in an ink formulation. Such ink may allow being applied to the substrate at a loading of 0.1 to 20 g ink per $m^2$.

Therefore, as the residual PAA in the slurry after derivatization might either induce an autopolymerization, or show a chemical affinity with the monomer, or the set of monomers used for the encapsulation of the pigment, the derivatization and the encapsulation synergistically or additively reduce the PAA-content on the pigment, resulting in a range of azoic pigments having a very low residual PAA content. The disclosed method herein is environment friendly and has a lower cost as compared to the abovementioned examples.

Figure 2:
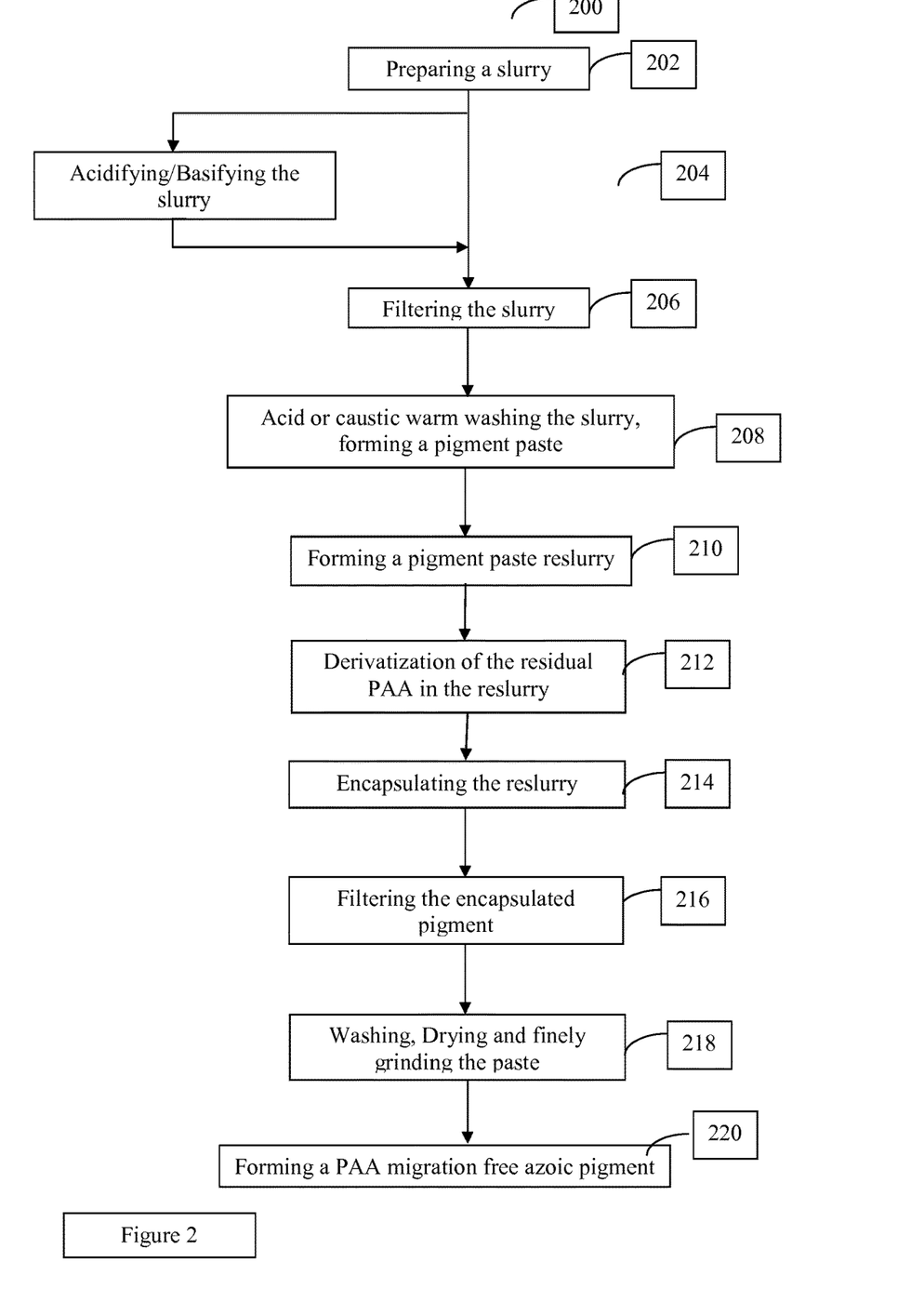
FIG. 2 illustrates a flowchart depicting a method for manufacturing an azoic pigment, according to another illustrative embodiment of the present invention.

According to some embodiments of the present invention, the present invention also discloses a method 200 for manufacturing azoic pigments. Mechanism of preparation of the method steps may be similar to that of the mechanism of the method steps described hereinbefore of the method 100 except a few steps.

For instance, slurry preparation, derivatization of the free PAA, encapsulation of the pigment, and final processing steps including filtration, drying and grinding at steps 202, 212, 214, 216, and 218 are similar to the steps 102-116 of the method 100. However, the method 200 includes performing additional steps 204, 206, 208 and 210.

In an embodiment of the present invention, the method may include working up the slurry by performing an optional acidification/basification of the slurry at the step 204 in order to bring the residual amount of primary aromatic amine sufficiently low before washing.

Thereafter, the worked-up slurry is filtered at step 206 followed by washing at step 208 to produce a paste of the pigment. The method proceeds to step 210 where a reslurry of the pigment is prepared. The reslurry of the pigment is prepared by first adding an amount of solvent to the pigment paste at a predetermined temperature range to form a dispersion. The dispersion thus formed is stirred until equilibrium on particle size is achieved.

For instance, the pigment paste after work-up, filtration and washing is reslurried in water (municipal water, purified river water or RO-water, or demineralized water). Other solvents can also be considered: f.i. glycol based esters (see Dowanol range). Preferably demineralized water is used to reslurry the pigment paste at 1 to 20% dry content using a high shear dispersion system at 10 to 180° C., preferably between 15 and 60° C. until an equilibrium on particle size distribution is achieved.

The particle size of the pigment paste at equilibrium may be <5 µm, preferably <2 µm, and ideally <1 µm.

In an embodiment of the present invention, a method 200 may be provided including synthesis of pigment slurry followed by optional heat treatment at step 202, and optional acidification or basification at step 204. Thereafter, the slurry is filtrated at step 206 and washed at step 208, with characteristics and requirements identical to step 110 of method 100. The washed pigment paste is reslurried at step 210, followed by derivatization of the free PAA and encapsulation of the pigment at steps 212 and 214 respectively. After encapsulation, the encapsulated pigment is filtrated and washed, dried and finely ground at steps 216 and 218 respectively, thereby forming encapsulated PAA migration free azoic pigments at step 220.

According to some embodiments, acidification or basification after encapsulation or derivatization can be avoided since by reslurrying and derivatization/encapsulation, residual amount of amine is negligible. Thus, acidification or basification after derivatization/encapsulation can have a negative impact on cost.

Figure 3:
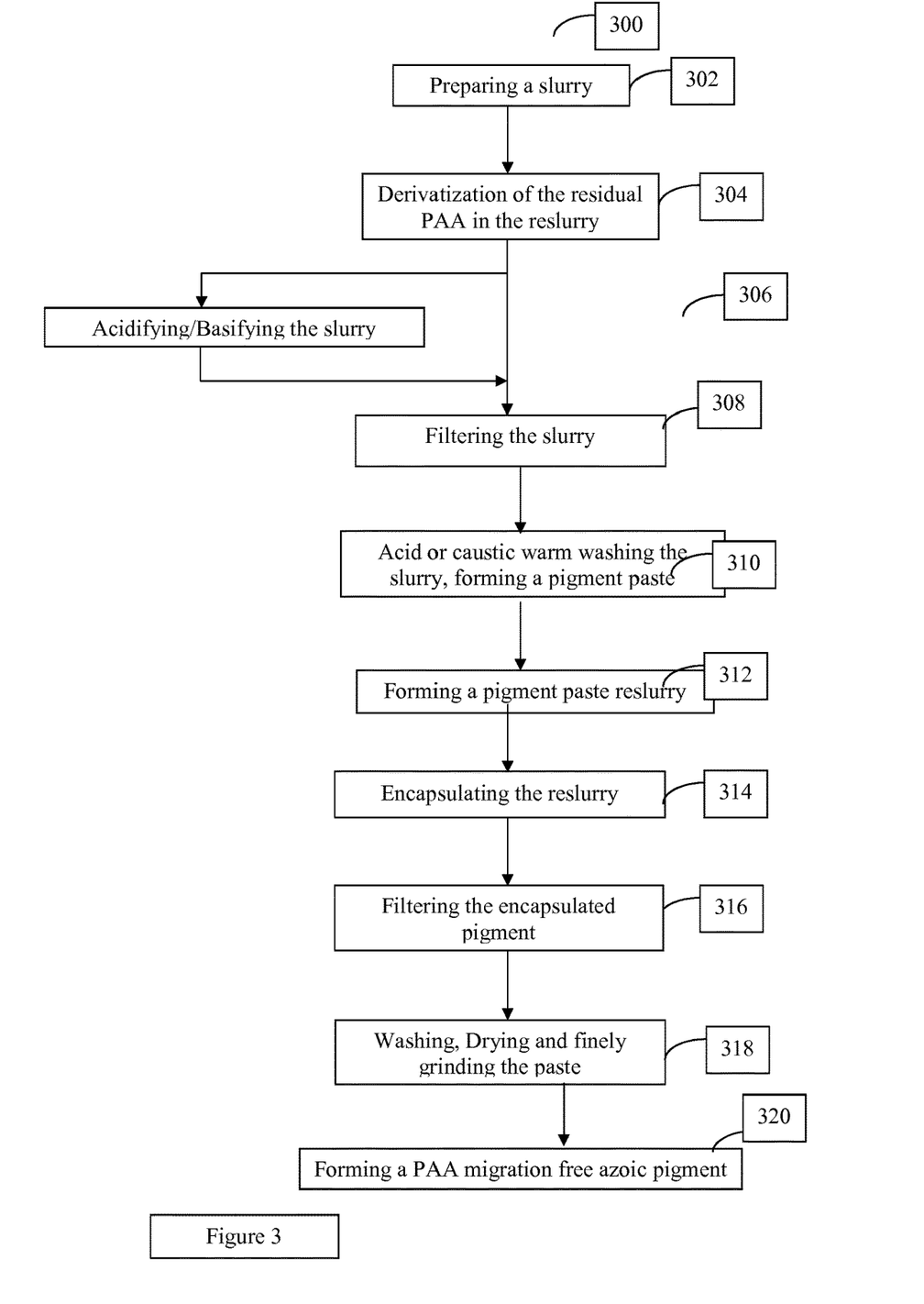
FIG. 3 illustrates a flowchart depicting a method for manufacturing an azoic pigment, according to yet another illustrative embodiment of the present invention.

According to yet another embodiment of the present invention, a method 300 for preparing azoic pigments is disclosed. The mechanism of each method step may be similar to the mechanism of the method steps described hereinbefore of the method 200 except for the following steps. For instance, slurry preparation, derivatization of the free PAA, encapsulation of the pigment, reslurry preparation, formation of a pigment paste, and final processing steps including filtration, drying and grinding at steps 302, 306, 314, 312, 310, 308, 316, and 318 respectively are similar to the steps 202-220 of the method 200. However, the arrangement of the method steps may be different. The method 300 includes synthesis of slurry at step 302, followed by derivatization at step 304.

After derivatization of the free PAA, the pigment slurry may be worked up by an optional acidification or basification at step 306 in order to ensure that undissolved residual amine will dissolved, thereafter filtering the slurry at step 308. The slurry is washed with acid or caustic warm water, forming a pigment paste, as indicated by step 310. The washed pigment paste is reslurried at step 312 followed by encapsulation at step 314. Thereafter, the encapsulated pigment is filtered at step 316.

Finally the pigment is washed, dried, and finely ground at step 318, thereby forming encapsulated PAA migration free azoic pigments.

While the preferred embodiment of the present invention and its advantages has been disclosed in the above detailed description, the invention is not limited there to but only by the scope of the appended claim. As will be readily apparent to those skilled in the art, the present invention may easily be produced in other specific forms without departing from its essential characteristics. The present embodiments is, therefore, to be considered as merely illustrative and not restrictive, the scope of the invention being indicated by the claims rather than the foregoing description, and all changes which come within therefore intended to be embraced therein.

EXAMPLES

Example 1 (Comparative Example)

By conventional art, an aqueous solution of tetrazotized 3,3-dichlorobenzidine (abbreviated as DCB), prepared from 50 parts of 3,3-dichlorobenzidine dihydrochloride hydrate, is reacted at pH 4 to 6.5 with an aqueous solution of coupling agent, prepared from 60 parts acetoacetyl-2,4-dimethylanilide and caustic soda, resulting in an azoic pigment slurry.

The temperature of the slurry is adjusted to 80° C. The slurry is stirred for 2 hours at 80° C. and filtered. The filtered pigment paste is further washed, dried and finely ground to provide C.I. Pigment Yellow 13.

Example 2 (Method 100)

By conventional art, an aqueous solution of tetrazotized 3,3-dichlorobenzidine, prepared from 50 parts of 3,3-dichlorobenzidine dihydrochloride hydrate, is reacted at pH 4 to 6.5 with an aqueous solution of coupling agent, prepared from 60 parts acetoacetyl-2,4-dimethylanilide and caustic soda, resulting in an azoic pigment slurry.

The pH of the slurry is corrected to pH 9 with dilute sodium hydroxide and the temperature is corrected to 40° C. 1 part of benzoyl chloride is added to the slurry and the slurry is stirred for 1 hour at 40° C.

20 parts of dipropylene glycol diacrylate are added to the pigment slurry, followed by 0.6 parts of a 10% aqueous solution of ammonium peroxodisulfate in water at 40° C. After stirring for 1 hour at 40° C., the slurry is heated at 80° C., and stirred for another 2 hours at 80° C.

The resulting slurry is filtered. The filtered pigment paste is further washed, dried and finely ground to provide a chemically pure C.I. Pigment Yellow 13.

Example 3 (Method 200)

The pigment slurry of C.I. Pigment Yellow 13 after synthesis, as prepared in aforementioned Example 1 from 50 parts 3,3-dichlorobenzidine dihydrochloride hydrate and 60 parts acetoacetyl-2,4-dimethylanilide, is heated at 80° C.

and stirred for 2 hours at 80° C. The slurry is filtered and washed by demineralized water.

The pigment paste is reslurried in demineralized water at 10% dry content at 40° C. by means of a high shear dispersion system until an equilibrium on particle size distribution is found, and the mean particle size is at least lower than 5 μm.

The pH is brought at pH 9 with dilute sodium hydroxide, followed by the addition of 1 part of benzoyl chloride to the slurry. The slurry is stirred for 1 hour at 40° C.

20 parts of dipropylene glycol diacrylate are added to the pigment slurry, followed by 0.6 parts of a 10% solution ammonium peroxodisulfate in water at 40° C. After stirring for 1 hour at 40° C., the slurry is heated at 80° C., and stirred for an additional 2 hours at 80° C. The slurry is filtered, washed, dried and finely ground to provide a chemically pure C.I. Pigment Yellow 13.

Example 4 (Method 300)

The pigment slurry of C.I. Pigment Yellow 13 after synthesis, as prepared in aforementioned Example 1 from 50 parts 3,3-dichlorobenzidine dihydrochloride hydrate and 60 parts acetoacetyl-2,4-dimethylanilide, is brought at pH 9 with dilute sodium hydroxide and the temperature is corrected to 40° C. 1 part of benzoyl chloride is added to the slurry and the slurry is stirred for 1 hour at 40° C. The slurry is heated at 80° C. and stirred for 2 hours at 80° C. The slurry is filtered and washed by demineralized water.

The pigment paste is reslurried in demineralized water at 10% dry content at 40° C. by means of a high shear dispersion system until an equilibrium on particle size distribution is found, and the mean particle size is at least lower than 5 μm.

20 parts of dipropylene glycol diacrylate is added to the pigment slurry, followed by 0.6 parts of a 10% solution ammonium peroxodisulfate in water at 40° C. After stirring for at 40° C., the slurry is heated at 80° C., and stirred for another 2 hours at 80° C. The slurry is filtered, washed, dried and finely ground to provide a chemically pure C.I. Pigment Yellow 13.

Example 5 (Method 200)

The pigment slurry of C.I. Pigment Yellow 13 after synthesis, as prepared in aforementioned Example 1 from 50 parts 3,3-dichlorobenzidine dihydrochloride hydrate and 60 parts acetoacetyl-2,4-dimethylanilide, is heated at 80° C., and stirred for 2 hours at 80° C. The slurry is filtered and washed by demineralized water.

The pigment paste is reslurried in demineralized water at 10% dry content at 60° C. by means of a high shear dispersion system until an equilibrium on particle size distribution is found, and the mean particle size is at least lower than 5 μm.

1 part of benzoyl chloride is added to the slurry and the slurry is stirred for 1 hour at 60° C., followed by a pH-correction at pH 5. 8.6 parts of a 20% aqueous potassium bromide solution are added to the pigment slurry, followed by dropwise addition of 20 parts of bisphenol A diglycidyl ether at 60° C. After stirring for 1 hour at 60° C., the slurry is heated at 90° C., and stirred for 1 hour at 90° C. The pH of the slurry is brought at 1.8 and stirred for another 1 hour at 90° C. The slurry is filtered, washed, dried and finely ground to provide a chemically pure C.I. Pigment Yellow 13.

Example 6 (Method 200)

The pigment slurry of C.I. Pigment Yellow 13 after synthesis, as prepared in aforementioned Example 1 from 50 parts 3,3-dichlorobenzidine dihydrochloride hydrate and 60 parts acetoacetyl-2,4-dimethylanilide, is heated at 80° C., and stirred for 2 hours at 80° C. The slurry is filtered and washed by demineralized water.

The pigment paste is reslurried in demineralized water at 10% dry content at 40° C. by means of a high shear dispersion system until an equilibrium on particle size distribution is found, and the mean particle size is at least lower than 5 μm.

1 part of benzoyl chloride is added to the slurry and the slurry is stirred for 1 hour at 40° C. 20 parts of a fatty acid modified polyester hexaacrylate are added to the pigment slurry, followed by 0.6 parts of a 10% solution ammonium peroxodisulfate in water at 40° C. After stirring for 1 hour at 40° C., the slurry is heated at 80° C., and stirred for 1 hour at 80° C. The pH of the slurry is brought to 1.8 and stirred for another 1 hour at 80° C. The slurry is then filtered, washed, dried and finely ground to provide a chemically pure C.I. Pigment Yellow 13.

Example 7 (Comparative Example)

By conventional art, an aqueous solution of diazotized 3-amino-4-methoxybenzanilide (or Fast Red KD Base), is prepared in the usual manner with 66.6 parts of 3-amino-4-methoxybenzanilide, 87 parts of concentrated hydrochloric acid and 12.3 parts of sodium nitrite. The cooled diazonium salt is reacted at pH 8 to 9 with an aqueous solution of coupling agent, prepared from 49.7 parts N-(5-chloro-2-methylphenyl)-3-hydroxynaphthalene-2-carboxamide, 6.3 parts of N-(4-chloro-2,5-dimethoxyphenyl)-3-hydroxynaphthalene-2-carboxamide and caustic soda, resulting in an azoic pigment slurry.

The temperature of the slurry is adjusted to 85° C. The slurry is stirred for 3 hours at 85° C. and filtered. The filtered pigment paste is further washed, dried and finely ground to provide C.I. Pigment Red 184.

Example 8 (Method 200)

The pigment paste of C.I. Pigment Red 184 after filtration and washing, as prepared in aforementioned Example 7, is reslurried in demineralized water at 10% dry content at 40° C. by means of a high shear dispersion system until an equilibrium on particle size distribution is found, and the mean particle size is at least lower than 5 μm.

The pH is brought at pH 9 with dilute sodium hydroxide, followed by the addition of 1 part of benzoyl chloride to the slurry. The slurry is stirred for 1 hour at 40° C. 20 parts of dipropylene glycol diacrylate are added to the pigment slurry, followed by 0.6 parts of a 10% solution ammonium peroxodisulfate in water at 40° C. After stirring for 1 hour at 40° C., the slurry is heated at 80° C., and stirred for an additional 2 hours at 80° C.

The slurry is filtered, washed, dried and finely ground to provide a chemically pure C.I. Pigment Red 184.

Example 9 (Method 200)

The pigment paste of C.I. Pigment Red 184 after filtration and washing, as prepared in aforementioned Example 7, is reslurried in demineralized water at 10% dry content at 40° C. by means of a high shear dispersion system until an equilibrium on particle size distribution is found, and the mean particle size is at least lower than 5 μm. 1 part of benzoyl chloride is added to the slurry and the slurry is stirred for 1 hour at 60° C., followed by a pH-correction at pH 5. 8.6 parts of a 20% aqueous potassium bromide solution are added to the pigment slurry, followed by dropwise addition of 20 parts of bisphenol A diglycidyl ether at 60° C. After stirring for 1 hour at 60° C., the slurry is heated at 90° C., and stirred for 1 hour at 90° C. The pH of the slurry is brought at 1.8 and stirred for another 1 hour at 90° C. The slurry is filtered, washed, dried and finely ground to provide a chemically pure C.I. Pigment Red 184.

Example 10 (Method 200)

The pigment paste of C.I. Pigment Red 184 after filtration and washing, as prepared in aforementioned Example 7, is reslurried in demineralized water at 10% dry content at 40° C. by means of a high shear dispersion system until an equilibrium on particle size distribution is found, and the mean particle size is at least lower than 5 μm.

1 part of benzoyl chloride is added to the slurry and the slurry is stirred for 1 hour at 40° C. 20 parts of an fatty acid modified polyester hexaacrylate are added to the pigment slurry, followed by 0.6 parts of a 10% solution ammonium peroxodisulfate in water at 40° C. After stirring for 1 hour at 40° C., the slurry is heated at 80° C., and stirred for 1 hour at 80° C. The pH of the slurry is brought at 1.8 and stirred for another 1 hour at 80° C. The slurry is then filtered, washed, dried and finely ground to provide a chemically pure C.I. Pigment Red 184.

Example 11: Control Method of the Pigment in Water Based Ink

A liquid flexo-acrylic ink is prepared according to the following composition:

Joncryl 8078: 66%±0.01%
Isopropanol: 12%±0.01%
Tap water: 20%±0.01%
Propyleneglycol: 1%±0.01%
APMMEA: 1%±0.01%

The pH of the flexo-acrylic ink is adjusted between pH 9 and 9.2 with a concentrated aqueous ammonia solution. For each pigment prepared according to the examples above, 2 inks are prepared (sample and reference) according to the table below:

| Component | Weight |
| --- | --- |
| Glass beads | 30.00 ± 1.00 g |
| Titanium dioxide RHD2 | — |
| Pigment | 3.00 ± 0.001 g |
| Flexo-Acrylic ink | *** g |

*** = complement the pigment with Flexo-Acrylic ink to 30.00 g ± 0.01 g

The prepared inks are ground on a skandex type disperser for 60 minutes. Illustrations are prepared on Kromekote type paper using barcoater no. 2 at 12 μm wet film thickness. The resulting illustrations are coloristically evaluated with a spectrophotometer using a measuring angle of 10° and standard illuminant D65 for their CIELa*b* colorimetric properties ΔE-ΔL-ΔC-ΔH.

Table 1 summarizes the coloristic properties of the above samples C.I. Pigment Yellow 13—reference: master standard Cappelle Diacetanil Yellow GR 1318C.

TABLE 1

| | COLORISTIC RESULTS | | | |
| --- | --- | --- | --- | --- |
| example | ΔE | ΔL | ΔC | ΔH |
| 1 | 0.65 | −0.21 | 0.17 | −0.59 |
| 2 | 0.37 | 0.20 | −0.23 | 0.20 |
| 3 | 0.95 | −0.10 | −0.50 | −0.80 |
| 4 | 0.23 | 0.22 | −0.04 | −0.07 |
| 5 | 0.92 | 0.40 | −0.57 | 0.60 |
| 6 | 0.43 | 0.14 | −0.39 | 0.09 |

Table 2 summarizes the coloristic properties of the above samples C.I. Pigment Red 184—reference: master standard Cappelle Naphtol Carmine 6B 8438C.

TABLE 2

| | COLORISTIC RESULTS | | | |
| --- | --- | --- | --- | --- |
| example | ΔE | ΔL | ΔC | ΔH |
| 7 | 0.47 | −0.22 | 0.13 | −0.40 |
| 8 | 1.39 | 0.25 | 0.08 | 1.36 |
| 9 | 3.25 | 1.16 | −0.03 | −3.03 |
| 10 | 2.36 | 0.93 | 0.32 | −2.15 |

Example 12: Residual Free Amine Quantification on the Pigments

About 50 mg of the pigment is weighted to a precision of 0.1 mg in a glass flask. 20±0.2 g of glass beads are added, followed by 50 mL of LC/MS grade MeOH. The flask is shaken for 1 hour on a skandex type disperser. An aliquot of the extract is filtered through a 0.2 μm syringe filter. The filtered extract is diluted 10-fold with 100 mM ammonium formate buffer in MQ water. Analysis is preferably performed by UPLC/MS-MS on a BEH column (length=50 mm, diameter=2.1 mm) using a mobile phase gradient consisting of Milli-Q type water and LC-MS grade methanol at a total flow of 0.42 mL/min. The limit of quantification is 1 mg/kg pigment.

Table 3 summarizes the residual free aromatic amine on C.I. Pigment Yellow 13 synthesized in the above samples.

TABLE 3

| | residual PAA amount | | |
| --- | --- | --- | --- |
| example | DCB (mg/kg) | 2,4-dimethylaniline (mg/kg) | ΣPAA (mg/kg) |
| 1 | <dl | 333 | 333 |
| 2 | <dl | 19 | 19 |
| 3 | <dl | 10 | 10 |
| 4 | <dl | 20 | 20 |
| 5 | <dl | 12 | 12 |
| 6 | <dl | 12 | 12 |

Table 4 summarizes the residual free aromatic amine on C.I. Pigment Red PR184 synthesized in the above samples.

TABLE 4

| example | residual PAA amount | | | |
|---|---|---|---|---|
| | FR KD BASE (mg/kg) | 5-Cl—2-Me-Aniline (mg/kg) | 4-Cl—2,5-(OMe)2-Aniline (mg/kg) | ΣPAA (mg/kg) |
| 7 | 61 | 18 | 8 | 87 |
| 8 | 28 | 14 | 3 | 45 |
| 9 | 10 | 13 | 2 | 25 |
| 10 | 20 | 12 | 3 | 35 |

The invention claimed is:

1. A method for manufacturing an azoic pigment, the method comprising the steps of
    i) obtaining a slurry of an azoic pigment, the slurry including residual primary aromatic amine (PAA);
    ii) derivatization of the residual PAA in the slurry;
    iii) encapsulation of the slurry;
    iv) final processing of the slurry, the final processing including forming PAA migration free azoic pigment;
    wherein the derivatization and encapsulation synergistically reduce PAA content thereby inhibiting migration of PAA from the pigment to a surface in contact.

2. The method of claim 1, wherein the method further comprises an acidification or basification of the slurry.

3. The method of claim 1, wherein the method further comprises a method of working up the slurry, the method comprising the steps of filtering and washing the pigment to obtain a pigment paste, and reslurrying the pigment paste by adding an amount of solvent; stirring said dispersion in a temperature range comprised between 10° C. and 180° C.

4. The method of claim 3, wherein the working up of the slurry is performed prior to step ii).

5. The method of claim 3, wherein the working up of the slurry performed prior to step iii).

6. The method of claim 2, wherein the acidification or basification step is performed after step i), or after step ii) or after step iii).

7. The method of claim 1, wherein the derivatization of the slurry includes addition of a derivatization agent into the slurry, wherein the derivatization agent is a haloalkane, an aldehyde, a ketone, an acyl halide, a sulfonyl halide, an organic acid anhydride, an epoxide, an epoxy wax, an isocyanate, an isothiocyanate, a (substituted) acrylic acid, a (substituted) acrylic acid ester, a (substituted) acrylamide, a (substituted) unsaturated aldehyde, a (substituted) unsaturated ketone, a (substituted) ethylene sulfonate, a lactone, a lactam, a haloalkane, hydrogen peroxide, sodium nitrite, an organic peroxide, phosgene, thionyl chloride, carbonyl diimidazole, or any combination thereof.

8. The method of claim 1, wherein encapsulation includes the addition of a monomer, or a set of monomers to the slurry.

9. The method of claim 8, wherein the monomer comprises one or more functional polymerizable groups selected from a vinyl group or an unsaturated carboxylic group.

10. The method of claim 7, wherein the derivatization agent is a bifunctional agent for the derivatization and encapsulation.

11. The method of claim 2, wherein the acidification or basification is performed by adding an acid selected from the group of hydrogen halides, sulfuric acid, sulfurous acid, phosphorous acid, phosphoric acid, phosphorous acid, hypophosphorous acid, nitric acid, sulphamic acid, carboxylic acids, or organic sulfonic acids, or a base selected from the group of caustic soda, potassium hydroxide, lithium hydroxide, calcium hydroxide or sodium (bi)carbonate.

12. The method of claim 6, wherein the reslurrying of azo based pigment is carried out in a temperature range comprised between 10° C. and 180° C.

13. The method of claim 3, wherein the stirring said dispersion occurs in the temperature range between 15° C. to 60° C. until an equilibrium on particle size distribution is reached.

14. The method of claim 8, wherein the set of monomers comprises [A] one or more monomers selected from a halogen leaving group, an organic acid, an ester, an acyl halogenide, an organic acid anhydride, a sulfonyl halide, a nitrile, an isocyanate, an isothiocyanate, a ketone, an aldehyde, an epoxide, an organosilane, a halosilane, an organomodified siloxane, a lactone, a lactam, a vinyl group and [B] one or more monomers selected from an alcohol, a thiol, an amine, or any combination thereof.

15. The method of claim 3, wherein the stirring said dispersion occurs in the temperature range between 15° C. to 60° C. until particle size at equilibrium of the pigment paste is less than 5 μm.

16. The method of claim 9, wherein the one of more functional polymerizable groups comprise an acrylate group, an acrylamide group, a methacrylate group, an unsaturated sulfonic group, an organosilane group, a halosilane group, an organomodified siloxane group, an isocyanate group, an epoxide group, a lactone, a lactam, or any combination thereof.

17. The method of claim 11, wherein the organic sulfonic acids comprise methanesulfonic acid.

18. A pigment obtained from a method of claim 1, suitable for being loaded into or onto a substrate comprising kraft paper, layered paper, meat paper, regenerated cellulose, board, (L)LDPE (linear low density polyethylene), PP (polypropylene), cellulose acetate, PET (polyethylene terephthalate), PA (polyamide), PVC (polyvinyl chloride), silicone, or nonwoven fabric, or any combination thereof.

19. The method of claim 14, wherein the set of monomers comprise a dual layer.

20. The method of claim 16, wherein the one or more polymerizable groups comprise a dual layer coating.

21. A pigment obtained from a method of claim 1, suitable for being incorporated into an ink in a range of 0.1-50% by weight with respect to the ink.

22. A pigment obtained from a method of claim 1, suitable for being incorporated into water-based acrylic, mineral offset, vegetable offset, polyamide, polyvinylbutyral, polyvinylchloride, solvent based nitrocellulose, cellulose acetate or UV-curable inks.

23. The method of claim 18, wherein the substrate is a multi-layered material.

* * * * *